US 8,312,276 B2

(12) United States Patent
Chiou et al.

(10) Patent No.: US 8,312,276 B2
(45) Date of Patent: Nov. 13, 2012

(54) METHOD FOR SENDING AND RECEIVING AN EVALUATION OF REPUTATION IN A SOCIAL NETWORK

(75) Inventors: Shin-Yan Chiou, Hsinchu (TW); Shih-Ying Chang, Hsinchu (TW); Ghita Mezzour, Pittsburg, PA (US); Adrian Perrig, Pittsburg, PA (US); Hung-Min Sun, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 559 days.

(21) Appl. No.: 12/411,396

(22) Filed: Mar. 26, 2009

(65) Prior Publication Data
US 2010/0205430 A1 Aug. 12, 2010

Related U.S. Application Data

(60) Provisional application No. 61/150,324, filed on Feb. 6, 2009.

(51) Int. Cl.
*H04L 9/32* (2006.01)
*H04L 29/06* (2006.01)
*H04L 9/00* (2006.01)
*H04L 9/30* (2006.01)
*G06F 7/04* (2006.01)
*G06F 15/16* (2006.01)
*G06F 17/30* (2006.01)
*G06F 21/00* (2006.01)
*H04K 1/00* (2006.01)
*G06Q 99/00* (2006.01)

(52) U.S. Cl. .................. 713/171; 726/6; 726/7; 726/28; 713/150; 713/153; 713/155; 713/172; 713/185; 380/30; 705/319

(58) Field of Classification Search .................. 713/156, 713/171
See application file for complete search history.

(56) References Cited

U.S. PATENT DOCUMENTS
5,870,744 A * 2/1999 Sprague ........................ 709/229
(Continued)

FOREIGN PATENT DOCUMENTS
TW 479182 3/2002

OTHER PUBLICATIONS

A Trustable Reputation Scheme Based on Private Relationships, Shin-Yan Chiou, Shih-Ying Chang, Ghita Mezzour, Adrian Perrig, and Hung-Min Sun, The 5th iCAST/CMU/TRUST Joint Conference on Security and Privacy Technologies, Jan. 7, 2009.

(Continued)

*Primary Examiner* — Carolyn B Kosowski
(74) *Attorney, Agent, or Firm* — Lin & Associates IP, Inc.

(57) ABSTRACT

A network reputation system and its controlling method are provided. A credential and exchange component permits a user to generate credentials and exchange matching items with those persons having a social relationship with the user. A reputation evaluation component enables other users to make evaluations about an estimatee via the sharing of social network information. A query and response component receives a query from a person having a social relationship with the user for requesting an evaluation about the estimatee, and responds with an associated evaluation result to the person having a social relationship with the user, via the sharing of social network information and the evaluations made by the other users about the estimatee.

8 Claims, 13 Drawing Sheets

U.S. PATENT DOCUMENTS

| | | | | |
|---|---|---|---|---|
| 6,112,186 | A * | 8/2000 | Bergh et al. | 705/7.32 |
| 6,839,690 | B1 * | 1/2005 | Foth et al. | 705/53 |
| 7,143,052 | B2 * | 11/2006 | LaSalle et al. | 705/7.33 |
| 7,472,110 | B2 * | 12/2008 | Achlioptas | 1/1 |
| 7,707,122 | B2 * | 4/2010 | Hull et al. | 705/319 |
| 7,716,079 | B2 * | 5/2010 | Hanif et al. | 705/1.1 |
| 7,818,200 | B2 * | 10/2010 | Kerschbaum et al. | 705/7.29 |
| 7,877,353 | B2 * | 1/2011 | Ahmed et al. | 707/611 |
| 7,886,334 | B1 * | 2/2011 | Walsh et al. | 726/1 |
| 8,010,460 | B2 * | 8/2011 | Work et al. | 705/319 |
| 8,010,619 | B1 * | 8/2011 | Lawler et al. | 709/217 |
| 8,015,484 | B2 * | 9/2011 | Backer | 715/234 |
| 8,200,819 | B2 * | 6/2012 | Chung et al. | 709/225 |
| 2002/0078152 | A1 * | 6/2002 | Boone | 709/204 |
| 2002/0103999 | A1 * | 8/2002 | Camnisch et al. | 713/155 |
| 2005/0192958 | A1 * | 9/2005 | Widjojo et al. | 707/5 |
| 2005/0216300 | A1 * | 9/2005 | Appelman et al. | 705/1 |
| 2006/0009994 | A1 * | 1/2006 | Hogg et al. | 705/1 |
| 2006/0253578 | A1 * | 11/2006 | Dixon et al. | 709/225 |
| 2006/0253584 | A1 * | 11/2006 | Dixon et al. | 709/225 |
| 2006/0294134 | A1 * | 12/2006 | Berkhim et al. | 707/102 |
| 2007/0245245 | A1 * | 10/2007 | Blue et al. | 715/739 |
| 2008/0005223 | A1 * | 1/2008 | Flake et al. | 709/203 |
| 2008/0077517 | A1 * | 3/2008 | Sappington | 705/35 |
| 2008/0120411 | A1 * | 5/2008 | Eberle | 709/225 |
| 2008/0133657 | A1 * | 6/2008 | Pennington | 709/204 |
| 2008/0189768 | A1 * | 8/2008 | Callahan et al. | 726/4 |
| 2008/0313723 | A1 * | 12/2008 | Naono et al. | 726/7 |
| 2009/0063630 | A1 * | 3/2009 | Obasanjo et al. | 709/204 |
| 2009/0070679 | A1 * | 3/2009 | Shen et al. | 715/733 |
| 2009/0178125 | A1 * | 7/2009 | Barber et al. | 726/6 |
| 2009/0210244 | A1 * | 8/2009 | Koister et al. | 705/1 |
| 2009/0265198 | A1 * | 10/2009 | Lester et al. | 705/7 |
| 2009/0299819 | A1 * | 12/2009 | Davis et al. | 705/10 |
| 2009/0306996 | A1 * | 12/2009 | Tsaparas et al. | 705/1 |
| 2009/0327054 | A1 * | 12/2009 | Yao et al. | 705/12 |
| 2009/0327907 | A1 * | 12/2009 | Estrada et al. | 715/739 |
| 2010/0042511 | A1 * | 2/2010 | Sundaresan et al. | 705/26 |
| 2010/0042931 | A1 * | 2/2010 | Dixon et al. | 715/738 |
| 2010/0122347 | A1 * | 5/2010 | Nadler | 726/26 |
| 2010/0125630 | A1 * | 5/2010 | Krishnamurthy et al. | 709/204 |
| 2010/0132049 | A1 * | 5/2010 | Vernal et al. | 726/27 |
| 2010/0199340 | A1 * | 8/2010 | Jonas et al. | 726/8 |
| 2010/0257183 | A1 * | 10/2010 | Kim et al. | 707/748 |
| 2011/0071953 | A1 * | 3/2011 | Shen et al. | 705/319 |
| 2011/0113098 | A1 * | 5/2011 | Walsh et al. | 709/204 |
| 2011/0161191 | A1 * | 6/2011 | Shen et al. | 705/26.1 |
| 2011/0219073 | A1 * | 9/2011 | Lawler et al. | 709/204 |
| 2011/0239282 | A1 * | 9/2011 | Svarfvar et al. | 726/5 |
| 2011/0314111 | A1 * | 12/2011 | Wang et al. | 709/206 |

OTHER PUBLICATIONS

Social approaches to trust-building in web technologies, Filippo Ulivieri Istituto di Scienzee Tecnologie della Cognizione Centro Naziona le delle Ricerche Roma, Italy, 0-7803-9469-0/05 1/$20.00 © 2005 IEEE, Authorized licensed use limited to: National Tsing Hua University. Downloaded on Mar. 24, 2009 at 06:49 from IEEE Xplore. Restrictions apply.

SIP Spam Detection, acine R eb ah i, Dorgham Sisalem, Thomas Magedanz, Fraunhofer Fokus, Kaiserin Augusta Allee 31, 10589,Germany, 0-7695-2650-0/06-$20.00 (c) IEEE Authorized licensed use limited to: National Tsing Hua University. Downloaded on Mar. 24, 2009 at 06:51 from IEEE Xplore. Restrictions apply.

Trust Based Knowledge Outsourcing for Semantic Web Agents, Li Ding, Lina Zhou and Timothy Finin, Proceedings of the IEEE/WIC International Conference on Web Intelligence (WI'03) Authorized licensed use limited to: Industrial Technology Research Institute. Downloaded on Mar. 25, 2009 at 03:05 from IEEE Xplore. Restrictions apply.

Improving Cooperation in Peer-to-Peer Systems Using Social Networks, Wenyu Wang, Li Zhao and Ruixi Yuan, 1-4244-0054-6/06/ $20.00 © 2006 IEEE Authorized licensed use limited to: National Tsing Hua University. Downloaded on Mar. 24, 2009 at 06:55 from IEEE Xplore. Restrictions apply.

Spam over Internet Telephony: Prototype Implementation Yacine Rebahi, C. S. Farres, Fraunhofer Fokus, Kaiserin Augusta Allee 31, 10589, Gennany 978-1-4244-2036-0/08/$25.00 © 2008 IEEE, Authorized licensed use limited to: National Tsing Hua University. Downloaded on Mar. 24, 2009 at 06:59 from IEEE Xplore. Restrictions apply.

Bring Reputation System to Social Network in the Maze P2P File-Sharing System, Mao Yang, Yafei Dai, Xiaoming Li, 0-9785699-0-3/06/$20.00© 2006 IEEE, p393~p400 Authorized licensed use limited to: National Tsing Hua University. Downloaded on Mar. 24, 2009 at 07:02 from IEEE Xplore. Restrictions apply.

An Approach to Optimize Local Trust Algorithm in SureMsg Service, Wenmao Zhang, Jun Bi, Jianping Wu, and Zheng Qin, 0-7695-2919-4/07 $25.00 © 2007 IEEE,p51~p54, Authorized licensed use limited to: National Tsing Hua University. Downloaded on Mar. 24, 2009 at 07:04 from IEEE Xplore. Restrictions apply.

A Trust Evaluation to Help On-line Consumer to Choose the Provider in Auction Web Site, Yo-Hsin Kuo, Fan Wu, Ruey-Lung Hsiao, 1-4244-0885-7/07/$20.00 © 2007 IEEE. Authorized licensed use limited to: National Tsing Hua University. Downloaded on Mar. 24, 2009 at 07:06 from IEEE Xplore. Restrictions apply.

TrustDavis: A Non-Exploitable Online Reputation System, Dimitri do B. DeFigueiredo and Earl T. Barr, Proceedings of the Seventh IEEE International Conference on E-Commerce Technology (CEC'05),2005 IEEE Authorized licensed use limited to: National Tsing Hua University. Downloaded on Mar. 24, 2009 at 07:07 from IEEE Xplore. Restrictions apply.

NetProbe: A Fast and Scalable System for Fraud Detection in Online Auction Networks, Shashank Pandit, Duen Horng Chau, Samuel Wang, Christos Faloutsos, P201~p210,WWW 2007, May 8-12, 2007, Banff, Alberta, Canada.

Toward a Comprehensive Model in Internet Auction Fraud Detection, Bin Zhang Yi Zhou Christos Faloutsos, Proceedings of the 41st Hawaii International Conference on System Sciences—2008.

A Trust Evaluation to Help On-line Consumer to Choose the Provider in Auction Web Site, Yo-Hsin Kuo, Fan Wu, Ruey-Lung Hsiao, 1-4244-0885-7/07/$20.00 © 2007 IEEE. Authorized licensed use limited to: IEEE Xplore. Downloaded on Jan. 29, 2009 at 05:41 from IEEE Xplore. Restrictions apply.

Extracting Reputation in Multi Agent Systems by Means of Social Network Topology, Josep M. Pujol, Ramon Sanguesa and Jordi Delgado, p467~p474, AAMAS •02, Jul. 15-19, 2002, Bologna, Italy.

Reputation and Social Network Analysis in Multi-Agent Systems, Jordi Sabater and Cartes Sierra, p475~p482,AAMAS'02, Jul. 15-19, 2002, Bologna, Italy.

Enhancing Reputation Mechanisms via Online Social Networks, Tad Hogg and Lada Adamic, p236~p237, EC'04, May 17-20, 2004, New York, New York, USA.

Do Social Networks Improve e-Commerce? A Study on Social Marketplaces, Gayatri Swamynathan, Christo Wilson, Bryce Boe, Kevin Almeroth, and Ben Y. Zhao, WOSN'08, Aug. 18, 2008, Seattle, Washington, USA.

Efficient Private Techniques for Verifying Social Proximity, Michael J. Freedman and Antonio Nicolosi, in Sixth International Work-shop on Peer-To-Peer Systems (IPTPS07), 2007.

* cited by examiner

| sid_Fran | pid_Fran | pk_Fran | sk_Fran | mk_Fran | item_Fran |
|---|---|---|---|---|---|
| | pid_Andy | pk_Andy | | | item_Andy |

| sid_Andy | pid_Andy | pk_Andy | sk_Andy | mk_Andy | item_Andy |
|---|---|---|---|---|---|
| | pid_Fran | pk_Fran | | | item_Fran |

FIG. 5

METHOD FOR SENDING AND RECEIVING AN EVALUATION OF REPUTATION IN A SOCIAL NETWORK

CROSS-REFERENCES TO RELATED APPLICATIONS

This application claims the benefit of U.S. Provisional Application No. 61/150,324, filed Feb. 6, 2009, which is incorporated by reference.

FIELD OF THE INVENTION

The present invention generally relates to a network reputation system and its controlling method thereof.

BACKGROUND OF THE INVENTION

The Internet has transformed the world into a global marketplace. For example, a person anywhere in the world may buy or sell goods to anyone else. Given such convenience, online applications such as auctions, multi-player games and social networks engender a huge potential market and consequently attract a lot of attention. Unfortunately, malicious behavior, such as account hijacking and non-delivery of goods in online auctions, introduces risks.

To prevent such risks, online applications employ reputation systems that rely on user-assigned scores to judge on other users' legitimate behavior. For example, a buyer in an online auction system may use the seller's score of the reputation system to judge whether the seller is trustworthy. However, a serious problem of existing reputation systems is the simplicity to create a highly trustworthy score by a seller himself or a seller's friend, or vice versa, create an untrustworthy score for a competitor. Since adversaries may apply several accounts to complete several faked transactions, foiling existing reputation systems is often straightforward.

Many approaches for addressing these challenges have been discussed. For example, Zhang et al. and Pandit et al. use a transaction network model to analyze auction fraud. In their model, they establish an undirected transaction graph where each node denotes a registered user and each edge indicates a completed transaction between the two users. By cooperating with other mathematical models and algorithms, they may identify potentially fraudulent users. Kuo et al. use reputation network constructed from buyer's feedbacks to identify fraudulent users.

Pujol et al. and Sabater et al. extract reputation by means of social network. Also, Hogg et al. summarize the reputation systems constructed via online social network. The online social network is automatically constructed from any observable internet interaction, such as the referred web links and emails in the homepages, and the relationships established in the social networking websites (e.g., facebook). These online relationships contribute online social network. This type of reputation system may enhance the effectiveness of the rating. Swamynathan et al. also shows that this type of reputation system is more trustful and satisfied than feedback reputation systems. Besides that, the notion to evaluate a user using social network may be applicable to other applications, such as Voice over IP (VoIP), Internet Message (IM), peer to Peer (P2P) and Reliable Email (RE). RE proposed by Freeman et al. considers privacy issue.

Although reputation systems have been proposed for solving these problems, most reputation systems in applications are still unreliable. Reputation systems also pose some privacy problems. For example, they may reveal private information of users. They would not achieve real reliability or being trustworthy if the online social relationship is not related to personal social relationship. Also, a forging problem may occur if an online social relationship is also not cryptographically verifiable. On the other hand, most of these systems reveal private personal information.

Social network represents relationships within a community. Several types of social network may be established according to different social relationship such as kinship, friendship, cooperation, etc.

Recently, research on private matching receives a lot of attention and several schemes and applications are proposed. Assuming there are two databases A and B, one query $Q \in A$ and one matching protocol computes $P=Q \cap B$. The scheme is secure and preserving privacy if it satisfies the following requirements. (1) Privacy: Each party can know only P and it's input to the matching protocol. Except for this information, each party learns nothing. (2) Non-spoofable: Items in A and B are really authorized by item owners. This means that the user may make query Q only if the owners of these items authorize and give the user these items. In other words, the user can not generate the queried items without authorization of the item owners. Besides that, the user should have some proofs to demonstrate that the item owner authorizes the user.

In Hash Protocol (HP), a person, who wants to query the common items in the other's database, computes hash values of items in his own database. Then he and the target exchange these hash values. By this way, they may find the common items without revealing the information of the un-matched items. On the other hand, Agrawal et al. proposed AgES which uses commutative encryption to achieve private matching. Freedman et al. proposed a polynomial-based private matching scheme. They use the property of homomorphic encryption to achieve better privacy. A variant of their scheme, set cardinality private matching, let databases A know only the cardinality of $Q \cap B$, not the actual items in this set. After that, Kissner and Song extend FNP scheme to support more functionality. HP, AgES and Freedman et al's schemes are categorized to asymmetric exchange of information, different from symmetric exchange in which both parties know the same information in the protocols.

Besides those, Li et al. proposed Data Ownership Certificate (DoC) to ensure non-spoofable. If the user does not obtain the item and the corresponding DoC, he can not make the query and convince the other.

SUMMARY OF THE INVENTION

The exemplary embodiments of present invention may provide a network reputation system and its controlling method thereof.

An exemplary embodiment relates to a network reputation system. The network reputation system is in conjunction with one or more estimator's social networks and one estimatee's reputation network, which may comprise: a credentials and exchange component that permits a user to generate credentials and exchange matching items with those persons having a social relationship with the user; a reputation evaluation component that enables other users to make evaluations about an estimatee via the sharing of social network information; and a query and response component that receives a query from a person having a social relationship with the user for requesting an evaluation about the estimatee, and responds with an associated evaluation result to the person having a social relationship with the user, via the sharing of social network information and the evaluations made by the other users about the estimatee.

Another exemplary embodiment relates to a controlling method for the network reputation system. The controlling method may comprise: a user producing master social network information via the user's social network; the user sharing social network information with those persons having a social relationship with the user through the conversion of the master social network information; the user making an evaluation about an estimatee via said social network information; a person having a social relationship with the user requesting an application server for the evaluation about the estimatee; and the application server replying an associated evaluation result about the estimatee to the person having a social relationship with the user, at least including the evaluation value evaluated by the user.

The foregoing and other features, aspects and advantages of the present invention will become better understood from a careful reading of a detailed description provided herein below with appropriate reference to the accompanying drawings.

BRIEF DESCRIPTION OF THE DRAWINGS

FIG. 5 shows an exemplary matching item exchange in phase 2, consistent with certain disclosed embodiments of the present invention.

DETAILED DESCRIPTION OF THE PREFERRED EMBODIMENTS

The disclosed exemplary embodiments may provide a network reputation system and its controlling method thereof, which uses at least a social network model on a transaction model to prevent reputation fraud. A user may judge an estimatee by the scores given by the user's personal social network. The present techniques may enable users to recognize evaluations submitted by their friends as these are more trustworthy. The mechanisms may preserve the privacy of the friendship relationships from the website, and the privacy of the mapping between the real identity of a user and her online identity from other users including her friends. For example, the present techniques may apply private matching methodologies in the system to prevent the disclosure of private social relationships.

In the disclosure, some assumptions are made, for example, assume that the estimator (say E) is part of a social network modeled as a graph $G=(V, E)$, where the vertices V denote the users of the system, and E denotes the relationships of the users. A user trusts all her contacts. Social network represents relationships within a community. Several types of social network may be established according to different social relationship, such as kinship, friendship, cooperation, etc. In the reputation system, social network may be built according to aforementioned relationships except trading relationship. The trading relationship is employed to build another network, which is called reputation network.

Figure 1:
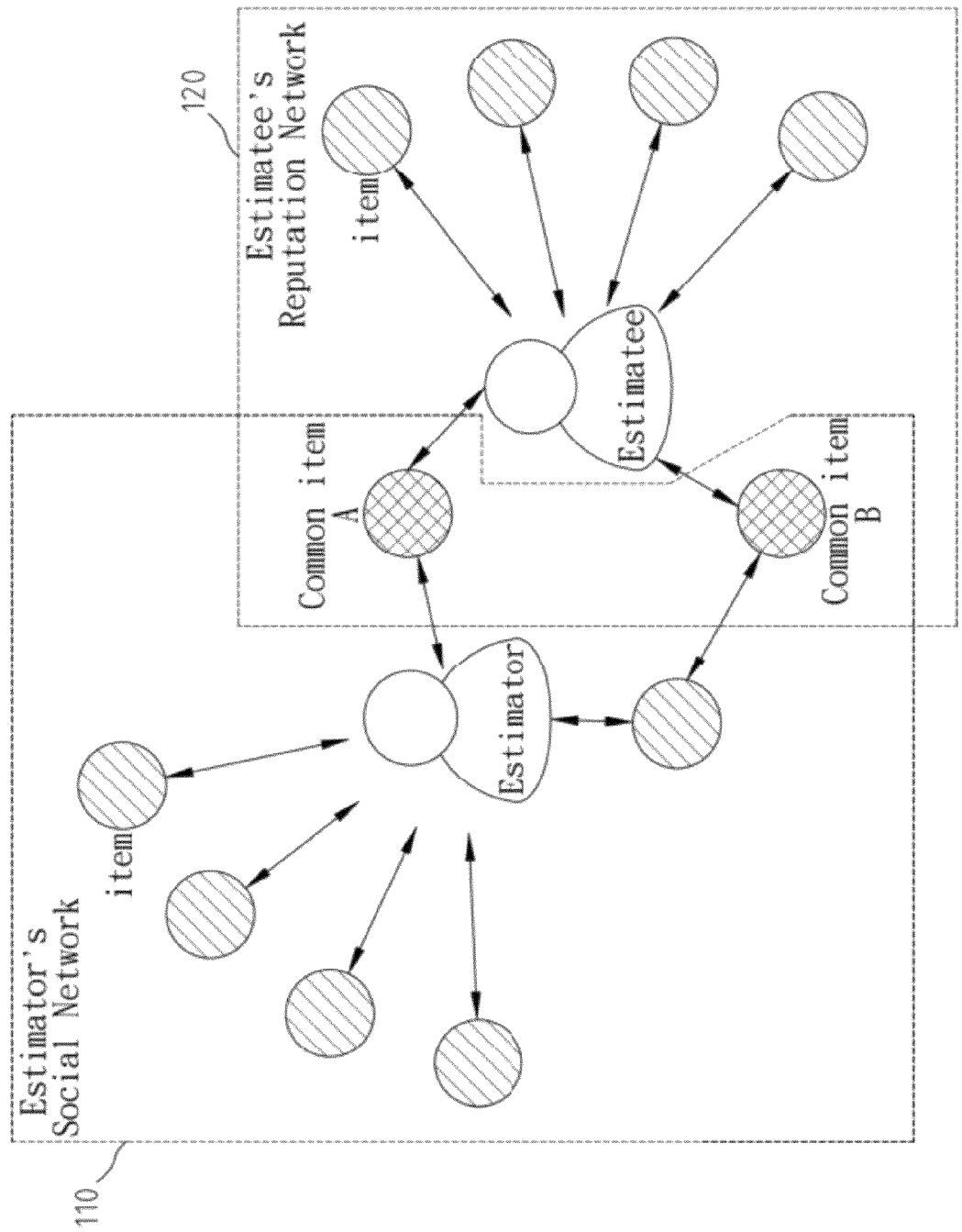
FIG. 1 shows an exemplary reputation system model in a privacy preserving fashion, consistent with certain disclosed embodiments of the present invention.

FIG. 1 shows an exemplary reputation system model in a privacy preserving fashion, consistent with certain disclosed embodiments of the present invention. As shown in FIG. 1, a social network may be established according to different social relationship of the estimator, i.e. the estimator's social network 110. And, a reputation network is employed, i.e. the estimatee's reputation network 120, in the reputation system model. There are some common items, such as item A and item B, between the estimator and the estimatee. According to the present invention, every estimator in the reputation system model recognizes evaluations in a privacy preserving fashion. The network reputation system of the present invention may be implemented in conjunction with one or more social networks and at least a computer-readable medium.

In the disclosure, it also assumes that the existence of an application server (AS) to which users register using a service identifier (SID). Online auction websites such as E-BAY and YAHOO, and online gaming sites may play the role of such an application server. The application server maintains for each dealer, the evaluations that the users submitted for her. Every user in the network owns a secret-public key pair (SK, PK). It also assumes the existence of secure and authenticated channels between a user and her friends, and between a user and an application server. However, it is not necessary to assume that the existence of a global public key infrastructure (PKI).

The disclosed exemplary embodiments of the present invention enable an estimator to recognize evaluations that were submitted for the estimatee to the application server by her friends, in a privacy preserving fashion as illustrated in FIG. 1. More specifically, when the disclosed exemplary embodiments are employed, at least the following three desired properties may be achieved. (1) Authenticity of the evaluations. The evaluations appearing to the estimator as submitted by one of her connections should indeed be submitted by one of her connections. In other words, it should not be possible to forge the origin of a review. (2) Privacy of the social relationships, such as friendship, from the application server. The application server learns no information about the social relationships of users. (3) Privacy of the mapping between the real identity and the online identity of users. The mapping between the real identity of a user and her online identity is protected from other users. For simplicity, the social relationship in the followings will take friendship as an example for explanation.

Figure 2:
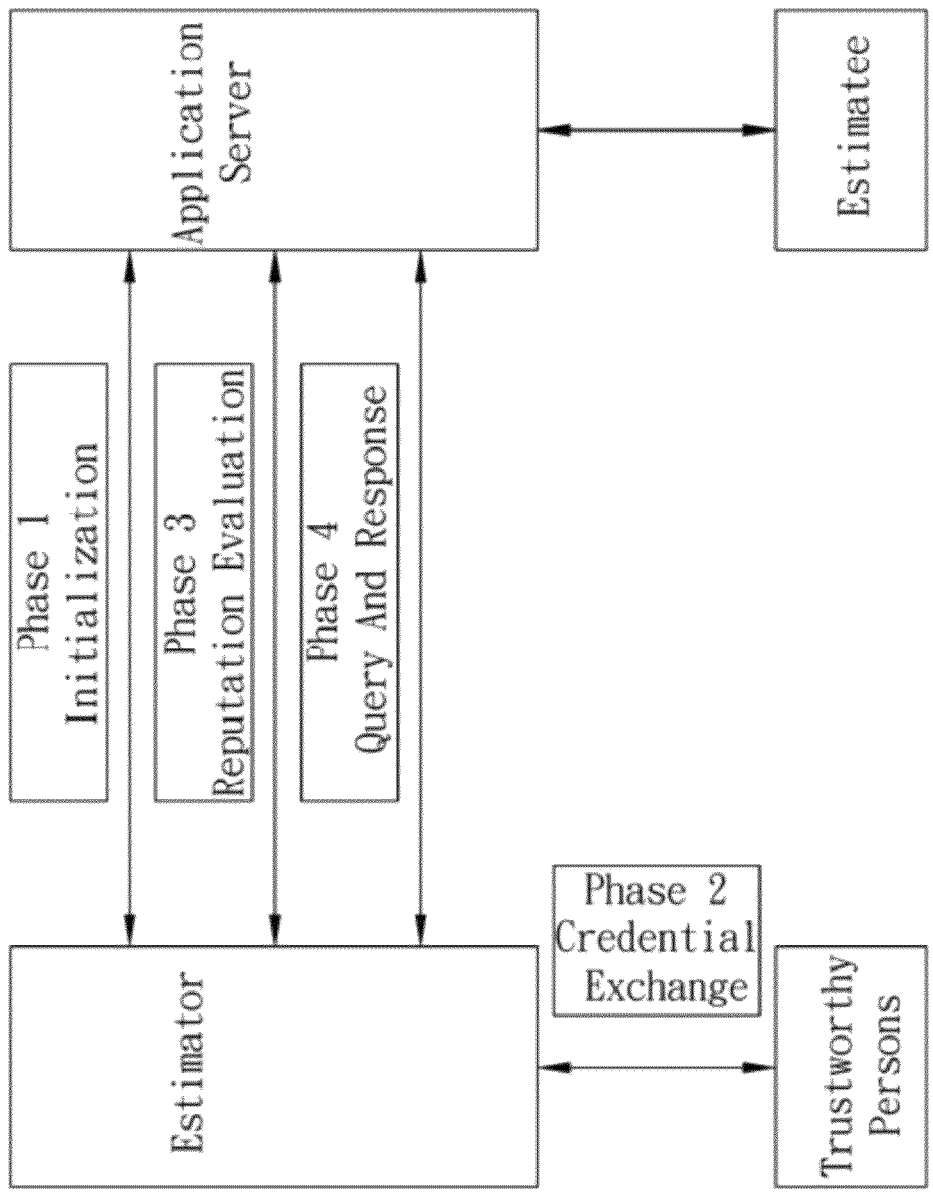
FIG. 2 shows an exemplary communication flow of the four phases, consistent with certain disclosed embodiments of the present invention.

In order to satisfy the desired properties, the protocol according to the present invention applies asymmetric HP to protect privacy due to its efficiency and security. The protocol runs in four phases, i.e. Initialization (Phase 1), Credential Exchange (Phase 2), Reputation Evaluation (Phase 3), and Query and Response (Phase 4). FIG. 2 shows an exemplary communication flow of the four phases, consistent with certain disclosed embodiments of the present invention. Referring to FIG. 2, during the first two phases, estimator or users generate credentials and exchange matching items with trustworthy persons, such as their friends. The third phase runs when a user wants to submit a review about some other user. The last phase enables an estimator to authenticate evaluations submitted by the trustworthy persons, such as her friends, about some estimatee.

Figure 3:
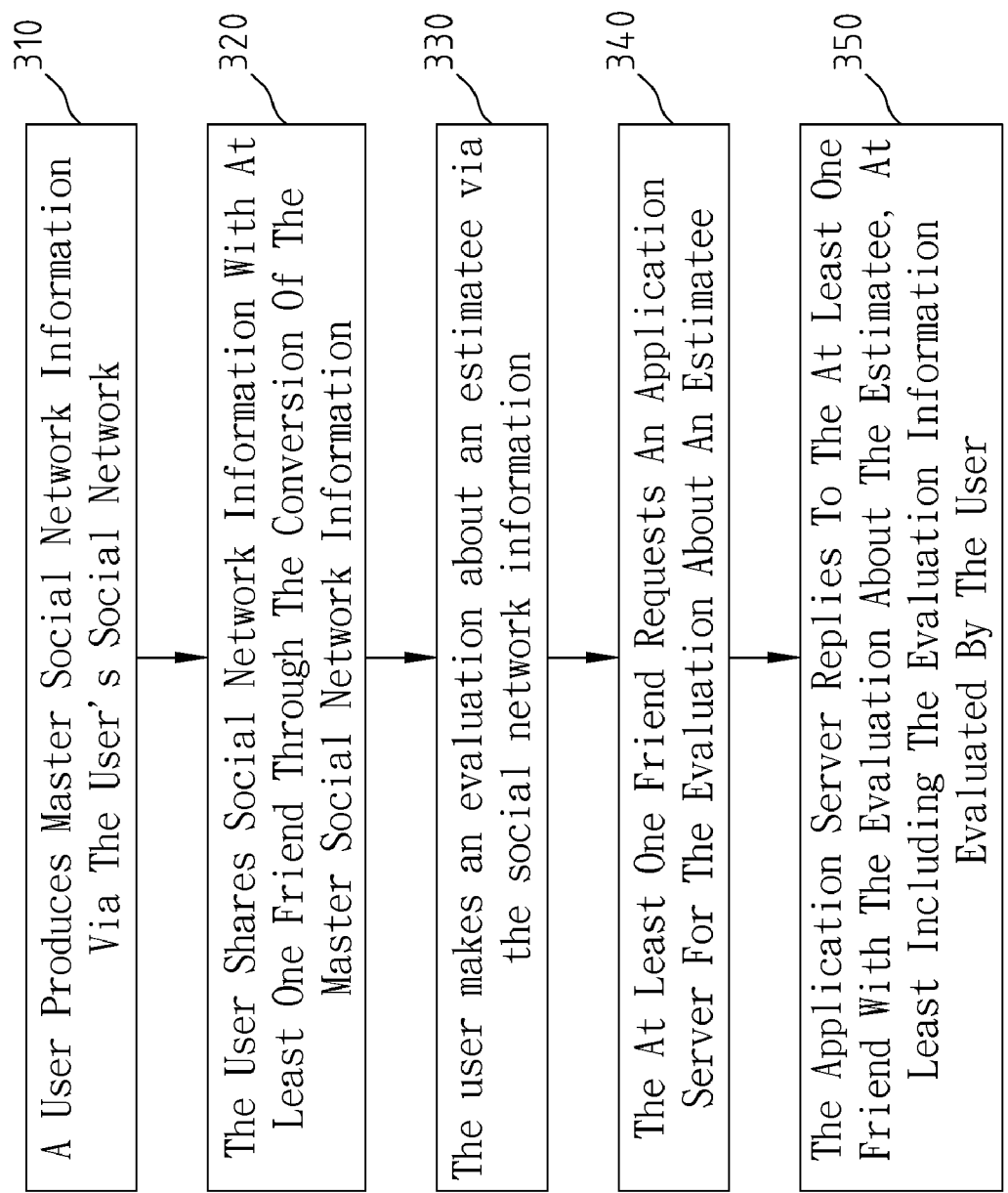
FIG. 3 shows an exemplary communication flow of a controlling method for a network reputation system, consistent with certain disclosed embodiments of the present invention.

To run the four phases under a network reputation system, an exemplary embodiment of its controlling method may be illustrated as in FIG. 3. FIG. 3 shows an exemplary communication flow of a controlling method for a network reputation system, consistent with certain disclosed embodiments of the present invention. An exemplary reputation system model may be illustrated as in FIG. 1. In the exemplary communication flow shown in FIG. 3, a user produces master social network information via the user's social network (step 310). The user shares social network information with at least one friend through the conversion of the master social network information (step 320). The user makes an evaluation about an estimatee via the social network information (step 330). The at least one friend requests an application server for the evaluation about an estimatee (step 340). The application server replies to the at least one friend with the evaluation about the estimatee, at least including the evaluation value evaluated by the user (step 350). For example, the application server may reply to the at least one friend with the evaluation information evaluated by the user and some others, or all the evaluation information related to the estimatee.

In step 340, the request for the evaluation about the estimatee may be derived from a formula P of social private matching query, which may utilize the social network information in the reputation system model. In addition, the application server may be requested to reply the evaluation with signature thereon. In step 350, the replied evaluation of the estimatee from the application sever may be obtained from another formula Q of social private matching response, which may utilize the formula P. Moreover, all of the replied evaluation of the estimatee from the application sever may have signature thereon. The followings describe detailed operations for each phase under a reputation system on networks, consistent with certain disclosed embodiments of the present invention.

Figure 4:
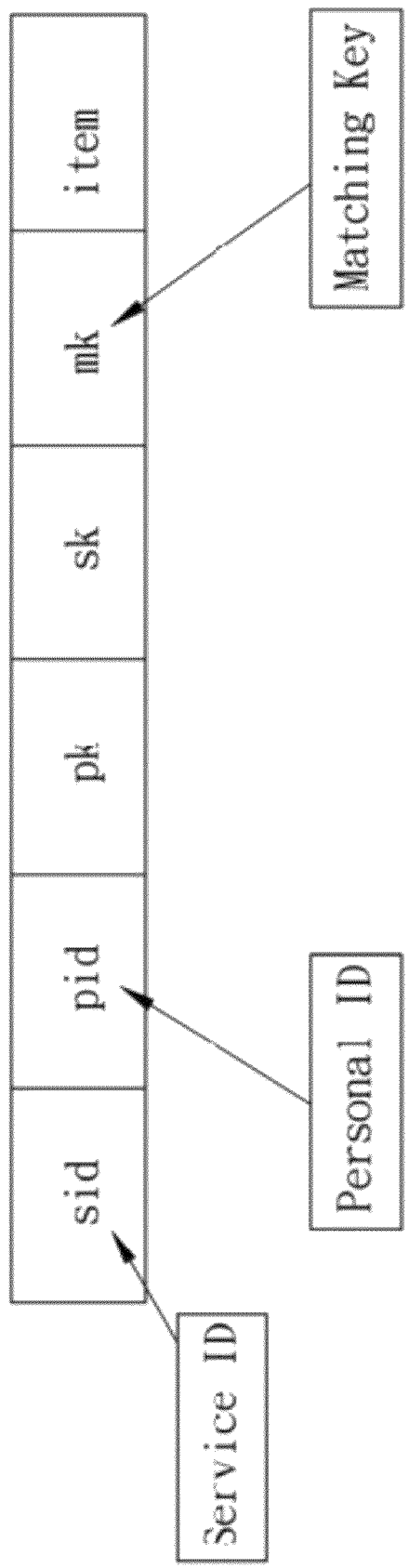
FIG. 4 shows exemplary master social network information for a user in phase 1, consistent with certain disclosed embodiments of the present invention.

In phase 1 (Initialization), each user produces his/her own parameters (i.e. master social network information). For the example shown in FIG. 4, user U may produce parameters pid, sid, pk, sk, and mk, where pid, the personal ID of user U, may be the name or nickname by which user U is recognized by her friends. sid, the service ID, may be the ID by which user U registered in the application server. (pk, sk) is a pair of public-private keys. Matching key mk is a random value chosen by the user U. The user U also computes an item to be used as a matching item. The item may be computed in different manners. For example, item=Hash(sid∥mk), or item=Hash(pid∥mk), or item=Hash(mk), or item=mk, where ∥ denotes concatenation and Hash(.) is a cryptographic hash function. In practice, these parameters may be generated through a downloadable application.

In phase 2 (Credential Exchange), each user sends a triple to each of her friends via a secure and authenticated channel. For example, user U sends the triple <pid, pk, item> to each of her friends via a secure and authenticated channel. In practice, the credentials may be exchanged via secure email, Bluetooth, SMS, etc. For the exemplary matching item exchange shown in FIG. 5, the triples of user U (say Andy) and her friend (say Fran) have been exchanged with each other via a secure and authenticated channel. In other words, the triple <pid_Andy, pk_Andy, item_Andy> in the master social network information for Andy is exchanged with the triple <pid_Fran, pk_Fran, item_Fran> in the master social network information for Fran in a private fashion.

Figure 6:
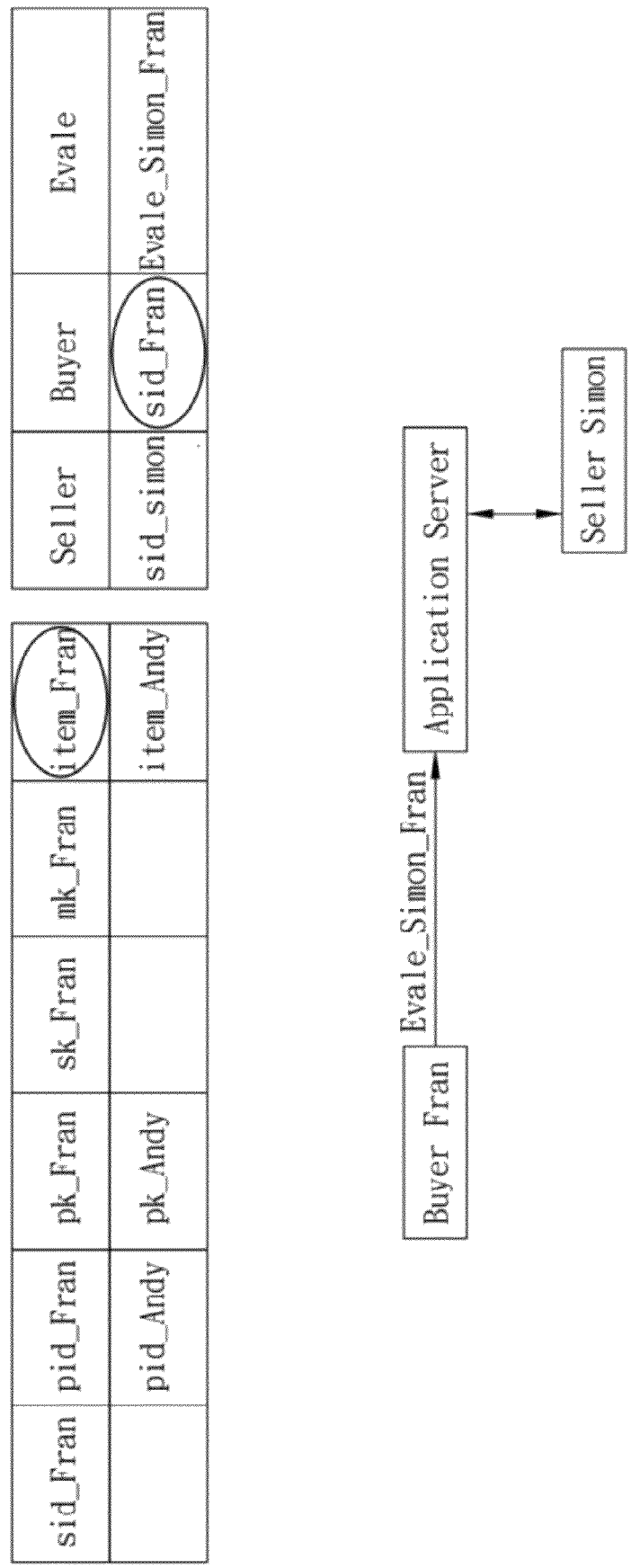
FIG. 6 shows an exemplary provable evaluation in phase 3, consistent with certain disclosed embodiments of the present invention.

In phase 3 (Reputation Evaluation), assume a user U_J had a transaction with a user U_S, and wants to submit an evaluation about the user U_S to the application server. User U_J sends the evaluation triple <sid_S, item_J, Evalu_S_J> to the application server, where Evalu_S_J= sid_S∥scr_S_J∥Sig_sk_J(E_Digst), Sig_sk_J denotes signature using signing key sk_J, E_Digst is defined as a hash function of (sid_S∥item_J∥scr_S_J), and scr_S_J is the score from user U_J to user U_S. FIG. 6 shows an exemplary provable evaluation, consistent with certain disclosed embodiments of the present invention. Wherein, user U_J (say Buyer Fran) has a transaction with user U_S (say Seller Simon), and sends the evaluation Evalu_Simon_Fran about the user U_S (Seller Simon) to the application server through an auction website. Note that item_J is not included in Evalu_S_J for privacy. The estimator may retrieve item_J form its own database if he is a friend of user U_J. Then, the application server stores the evaluation triple <sid_S, item_J, Evalu_S_J> in the database.

Phase 4 (Query and Response) runs when an estimator U_I wants to recognize the evaluations submitted to the application server by her friends about an estimatee U_S. Assume estimator U_I has a set $X=\{x\_1, x\_2, \ldots, x\_ki\}$, where x_ is an item received by estimator U_I from one of her friends during phase 2, and application server has a set $Y=\{y\_1, y\_2, \ldots, y\_ks\}$ where y_ is the item of one of the users that submitted an evaluation for user U_S. Note that X is a set of 1-distance items. In other words, the holder of the items is a friend of estimator U_I.

In phase 4, the communication flow between estimator U_I and the application server may include the following steps. (1) User U_I sends a query concatenated with sid_I (service ID) to the application server to request the evaluation submitted to the application server by the friends of User U_I about the estimatee U_S. (2) The application server computes an encryption function H, for example, H may be the concatenation of a plurality of Hash functions, such as H= $h\_1\|h\_2\| \ldots \|h\_ks$, where $h\_I=\text{Hash}(y\_I)$, $1 \leq I \leq ks$. (3) The application server sends the encryption function H concatenated with a plurality of the evaluations back to the estimator U_I.

For example, the produced evaluation sent from the application server may be defined as follows.

$$H\|\text{Evalu\_S\_1}\|\text{Evalu\_S\_2}\| \ldots \|\text{Evalu\_S\_ks}$$

By using it, only the person who owns/knows the item y_I can decrypt the value Evalu_S_I and know the score inside Evalu_S_I. (4) Estimator U_I compares Hash(x_J), $1 \leq J \leq ki$, with $h\_L$, $1 \leq L \leq ks$. If h_M is matched, estimator U_I verifies the associated Evalu_S_M by using the public key pk_M which is obtained in phase 2. As a result, estimator U_I learns the scores given by his/her friend and then makes a further decision. However, if none is matched, it means estimator U_I has no friend who has estimation on estimatee U_S. In this case, estimator U_I may learn the scores in Evalu_S_S although it may not be trustworthy.

In other words, evaluation result about the estimatee may be obtained via a concatenation of a plurality of parameters, at least including a service identity of the estimatee, an authentication from other users, and a score evaluated by other users on the estimatee. In addition, the authentication may be through a channel of using signing key with an encrypted function, such as hash function, of the service identity of the estimatee, each matching item of each of other users and the score evaluated by the other users on the estimatee.

Figure 7:
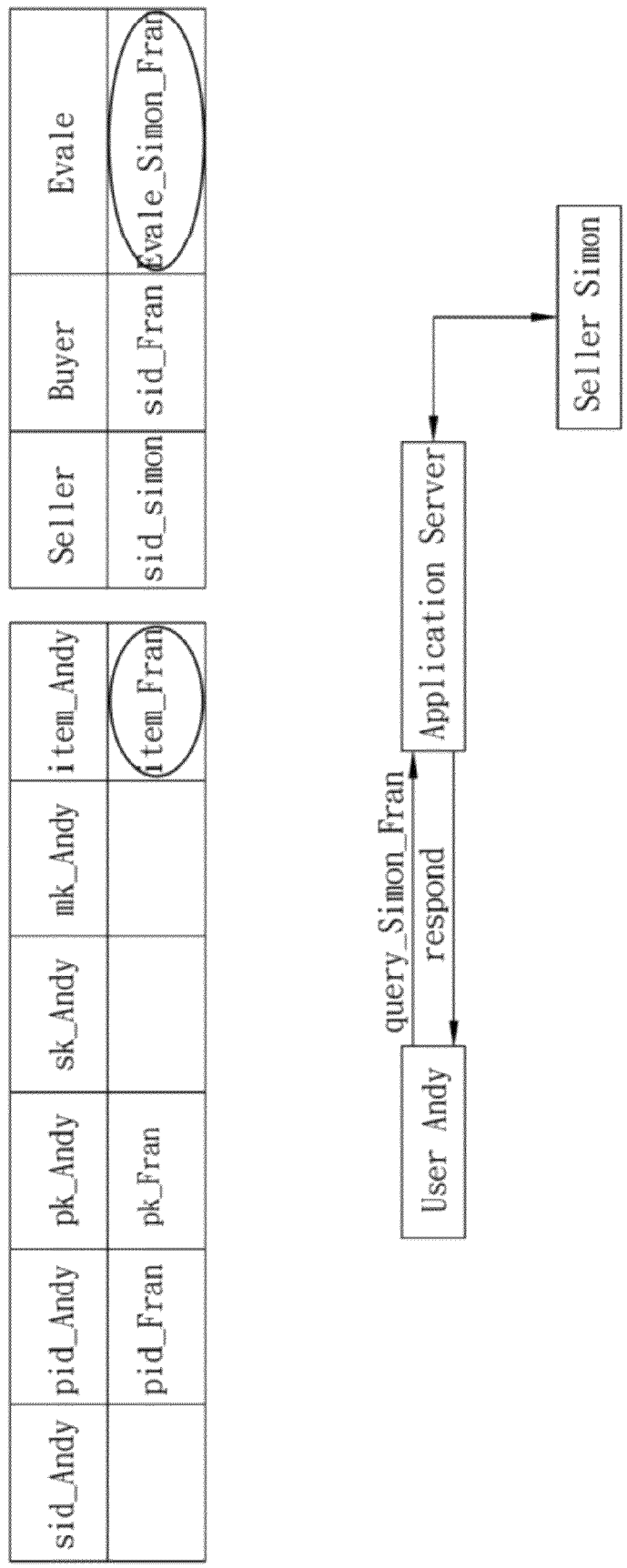
FIG. 7 shows exemplary query and respond in phase 4, consistent with certain disclosed embodiments of the present invention.

FIG. 7 shows exemplary query and respond in phase 4, consistent with certain disclosed embodiments of the present invention. Wherein, user U_J (say Andy) wants to recognize the evaluation Evalu_Simon_Fran submitted to the application server by her friend (say Buyer Fran) about the estimatee U_S (say Seller Simon).

According to the present invention, some schema may be taken to increase the matching rate in the protocol of the disclosed exemplary embodiments. One exemplary scheme is to accept more social relationships. If more social relationships are expanded, then there are more items for matching. For example, people working in the same organization may exchange their items. Then, the matching rate may be increased. Another exemplary scheme is to use the items having greater distance. Since the estimator has more items for matching, the matching rate obviously increases.

Figure 8:
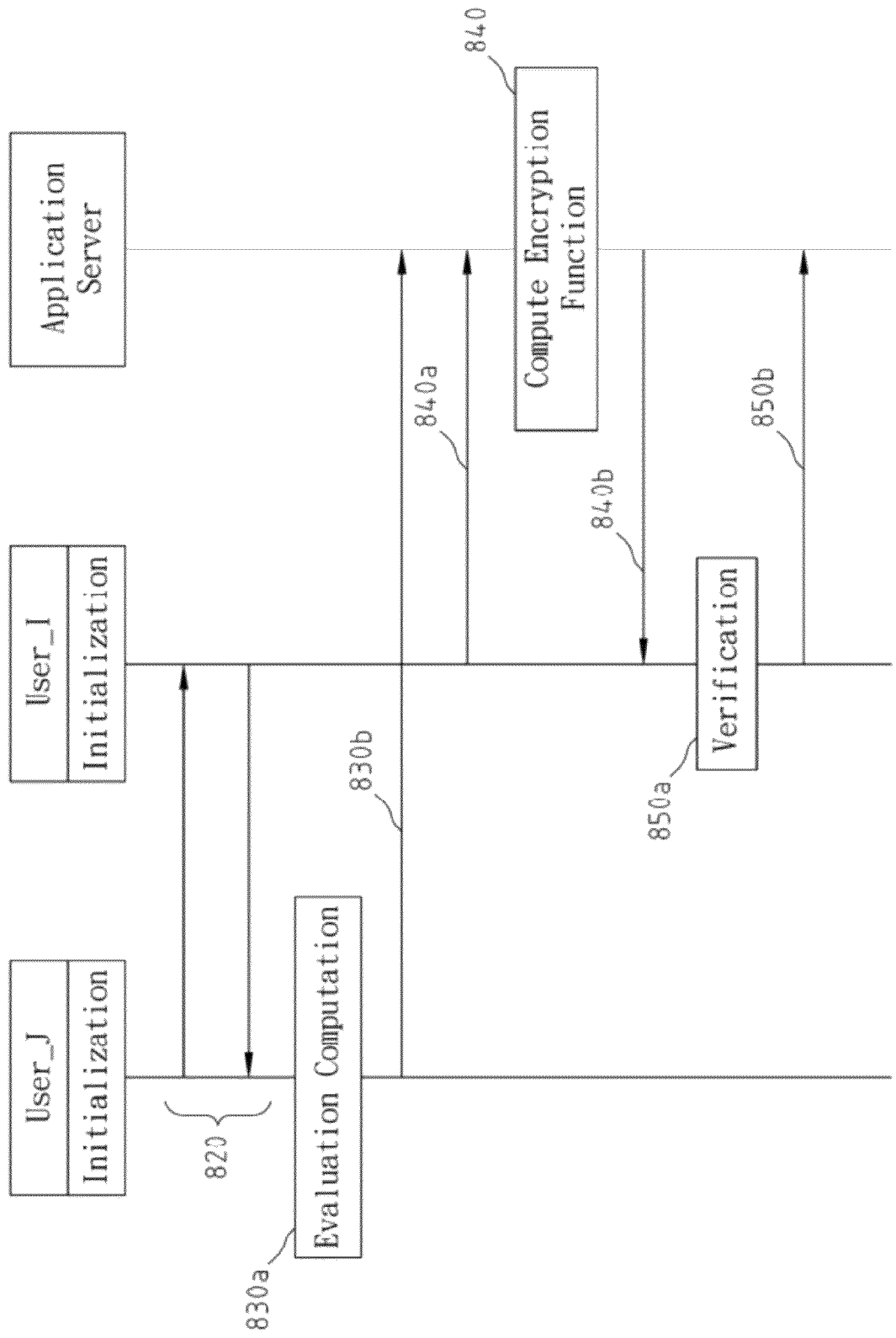
FIG. 8 shows an exemplary schematic view of a protocol running in four phases for estimatee U_S, consistent with certain disclosed embodiments of the present invention.

FIG. 8 shows an exemplary schematic view of a protocol running in the above-identified four phases for estimatee U_S, consistent with certain disclosed embodiments of the present invention. At first, each user U may produce her/his own parameters pid, sid, pk, sk and mk, and has an associated item. Then, the credentials for both two users, such as user U_I and user U_J, may be exchanged. For example, triple <pid_I, pk_I, item_I> and triple <pid_J, pk_J, item_J> are exchanged via a secure and authenticated channel, marked as 820. Assume that user U_J had a transaction with a user U_S, and wants to submit an evaluation about the user U_S to the application server. After evaluation computation 830*a*, user U_J sends the evaluation triple <sid_S, item_J, Evalu_S_J> to the application server, marked as 830*b*. When user U_I (estimator) wants to recognize the evaluations submitted to the application server about the user U_S (estimatee), user U_I may send a query with service ID to the application server, marked as 840*a*. The application server may compute an encryption function H (marked as 840) and send the encryption function H concatenated with a plurality of the evaluations back to the estimator U_I, marked as 840*b*. After the verification (marked as 850*a*) for the evaluation result sent by the application server, user U_I may make a further decision, marked as 850*b*.

In practice, estimator U_I may upload the request and download the result via an application connecting to the server. The FNP scheme disclosed in "Efficient Private Matching and Set Intersection" may be chosen over the other private matching protocols because of its flexibility and extensibility. The extension schemes will be discussed in the followings.

The present invention may be extended to achieving more features. For example, the first feature is the present invention may provide variants of private matching algorithm to protect some privacy-sensitive transaction, such as set cardinality private matching which let a user know only the number, instead of who, of his/her friends that had reputation on estimates U_S. In this case, the application server does not send encrypted Evalu_S_I to estimator U_I for protecting the privacy of the items those link identities.

The second feature is the present invention may provide query by using n-distance items. For example, n=2, i.e., if the estimator is a friend's friend, it is possible to match his/her reputation record without revealing any private information. For example, assume Andy's friend F receives the item FF (i.e. the item B in FIG. 1) and the public key pk_FF from F's friend FF, whom Andy does not know before. F may just send Andy the item FF and the public key pk_FF from FF without telling Andy who FF is. Therefore, Andy may use item FF and key pk_FF to match FF's reputation record without revealing any private relationship between F and FF. This may be done in Phase 2. However, if FF is Andy's friend, then Andy will know F and FF are friends.

In the real world, the strength of relationship may not be estimated by just "YES" or "NO", that means having relationship or not. Different relationships may give different weights, which denote the strength of trust. For example, kinship often has higher weight than friendship. Of course, users may be able to decide the weights.

The third feature is the present invention may provide group-based matching. One may choose to generate two or more items and send one or more of these items to their different friends. The items may be for public, group, personal or private usage which is used in different purposes depending on how private they are or how public they are desired to be revealed. For example, for trades for public use and trades for private use, different items may be used. This may prevent private transaction information from disclosing to unclose friends such as co-workers.

The followings give some working examples to illustrate the controlling method for a network reputation system of the present invention.

Figure 9:
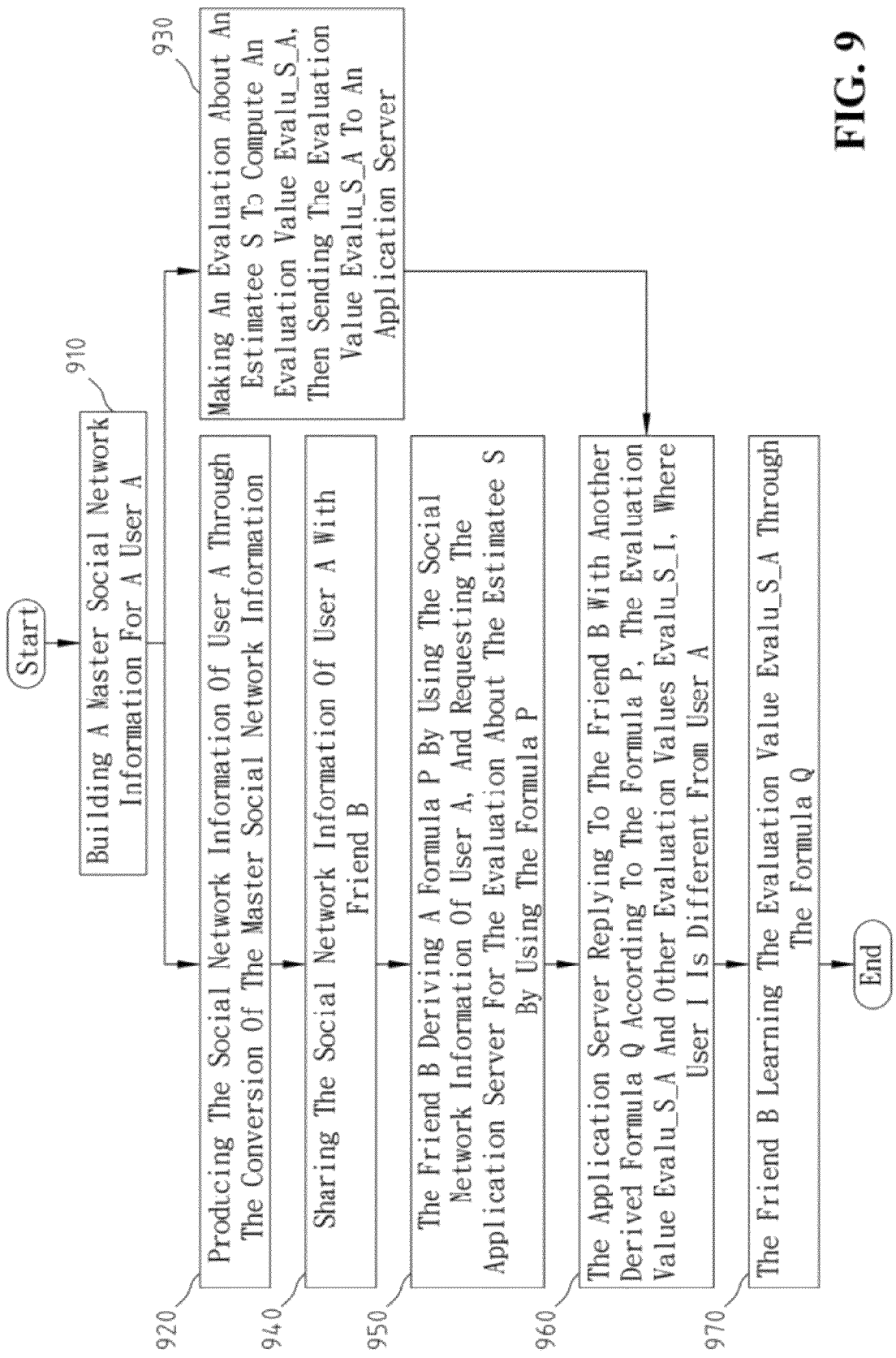
FIG. 9 shows an exemplary communication flow of the first working example, consistent with certain disclosed embodiments of the present invention.

The first working example may be described as follows. (1) User B's friend or friend's friend A makes an evaluation about an estimatee S. (2) User B derives a formula P by using the social network information of A. (3) User B requests an application server for the evaluation about estimatee S made by A. (4) Through the social network information of A, user B gets the evaluation about the estimatee S from the application server, and verifies its correctness. FIG. 9 shows an exemplary communication flow of the first working example, consistent with certain disclosed embodiments of the present invention.

Referring to FIG. 9, the exemplary communication flow may comprise the following steps. (1) building a master social network information for a user A (step 910); (2) producing the social network information of user A through the conversion of the master social network information (step 920); (3) making an evaluation about an estimatee S to compute an evaluation value Evalu_S_A, then sending the evaluation value Evalu_S_A to an application server (step 930); (4) sharing the social network information of user A with a friend B (step 940); (5) the friend B deriving a formula P by using the social network information of user A, and requesting the application server for the evaluation about the estimatee S by using the formula P (step 950); (6) the application server replying to the friend B with another derived formula Q according to the formula P, the evaluation value Evalu_S_A and other evaluation values Evalu_S_I, where user I is different from user A (step 960); and (7) the friend B learning the evaluation value Evalu_S_A through the formula Q (step 970).

In the communication protocol of the first working example, such as private matching scheme may be used to achieve the privacy preserving for both user identity and social network information. It may also use a way of signature to achieve the authentication. In other words, private matching and signature are bounded together in the communication protocol.

The first working example gives some features, such as (1) friend B may learn the evaluation value submitted to the application server by only the user A about the estimatee S, but may not learn the evaluation value about the estimatee S from others, this will protect other strangers' privacy; (2) the application server learns nothing about the social network of user A or friend B, therefore, the application server learns nothing about the relationship between user A and friend B; (3) friend B may verify the correctness of the evaluation value Evalu_S_A via the formula Q and the social network information, and guarantee the contents of the evaluation value not being changed; and (4) no one may forge any data successfully.

Figure 10:
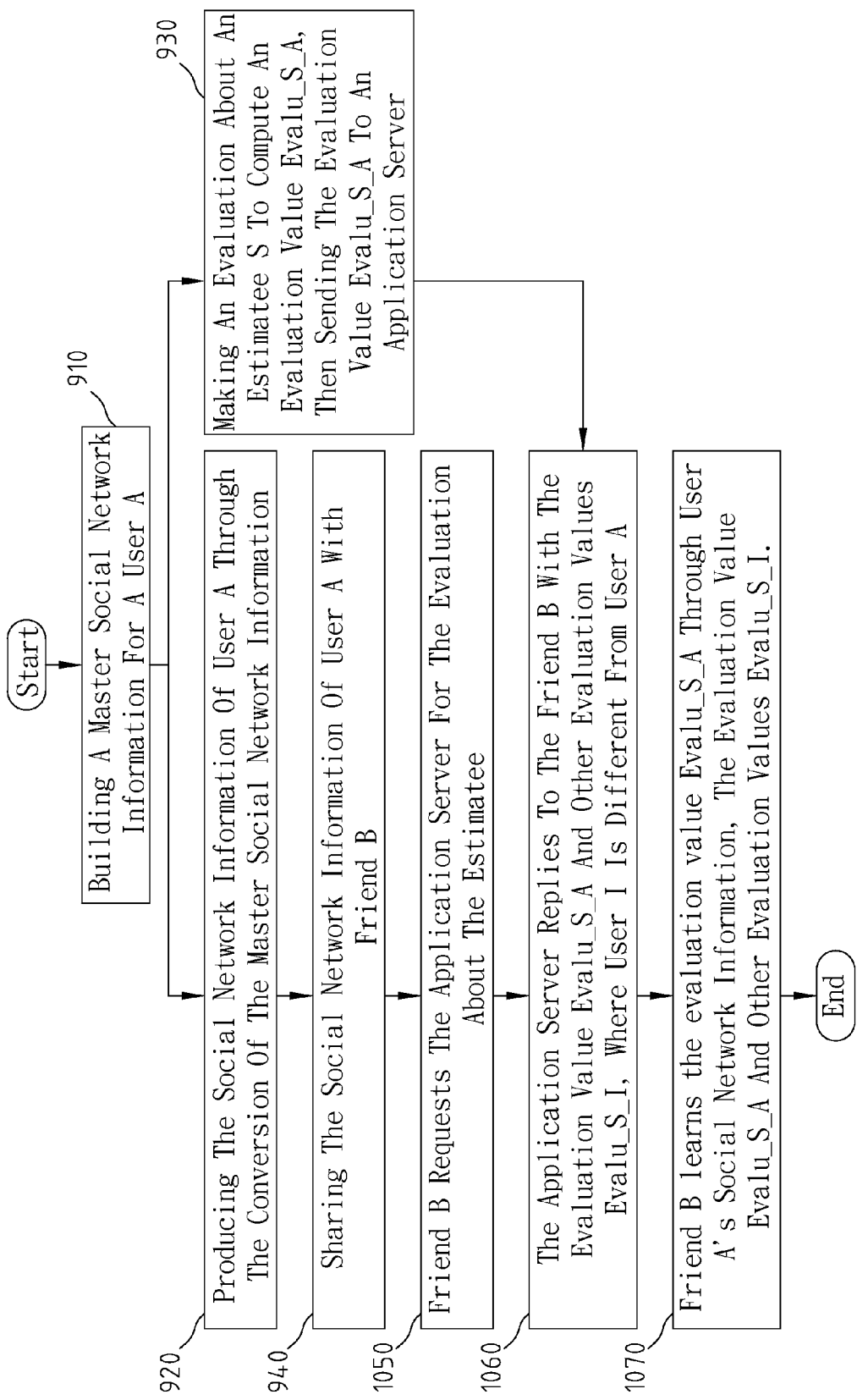
FIG. 10 shows an exemplary communication flow of the second working example, consistent with certain disclosed embodiments of the present invention.

The second working example may be described as follows. (1) User B's friend or friend's friend A makes an evaluation about an estimatee S. (2) User B requests an application server for the evaluation of the estimatee S made by A. (3) The application server replies with all evaluations about the estimatee S. (4) User B gets the evaluation about the estimatee S from the application server by using A's social network information, and verifies its correctness. FIG. 10 shows an exemplary communication flow of the second working example, consistent with certain disclosed embodiments of the present invention.

Referring to FIG. 10, the exemplary communication flow may comprise the steps 910-940 and the following steps 1050-1070. Step 1050 is that the friend B requests the application server for the evaluation about the estimatee. Step 1060 is that the application server replies to the friend B with the evaluation value Evalu_S_A and other evaluation values Evalu_S_I, where user I is different from user A. Step 1070 is that the friend B learns the evaluation value Evalu_S_A through user A's social network information, the evaluation value Evalu_S_A and other evaluation values Evalu_S_I.

In the communication protocol of the second working example, such as sharing bridge identity may be used to achieve the privacy preserving for user identity. It may also use a way of signature to achieve the authentication. The application server may sends (Bridge ID, Signature)/Bridge ID contained in the entire or partial evaluation values to friend B to protect the privacy of social information. In practice, some designs may be employed as follows, during the initialization, the evaluation submission and the evaluation retrieval. (1) During the initialization, a user may use a pseudonym to register at the review site. When exchange credentials with friends, the user may use real name, and the public keys are exchanged with and only given to friends. However, a Bridge ID for the user may be given to both the review site and friends. (2) During the evaluation submission, a user may submit a signed evaluation to the review site after a transaction with a seller. The review site may store the signed evaluation. (3) During the evaluation retrieval, a user may retrieve all evaluations about the seller when considering a transaction with the seller, and distinguish reviews by friends. The privacy of friendship relationships may be preserved through the Bridge ID.

The second working example gives some features, such as (1) friend B may learn all the evaluation values submitted to the application server about the estimatee S, and the contents of the evaluation values may also be encrypted by their own private keys inside their own social network information; (2) the application server learns nothing about the social network of user A or friend B, and this will protect the user A's privacy and friend B's privacy; and (3) friend B may verify the correctness of the evaluation value Evalu_S_A via the social network information, and guarantee the contents of the evaluation value not being changed.

Figure 11:
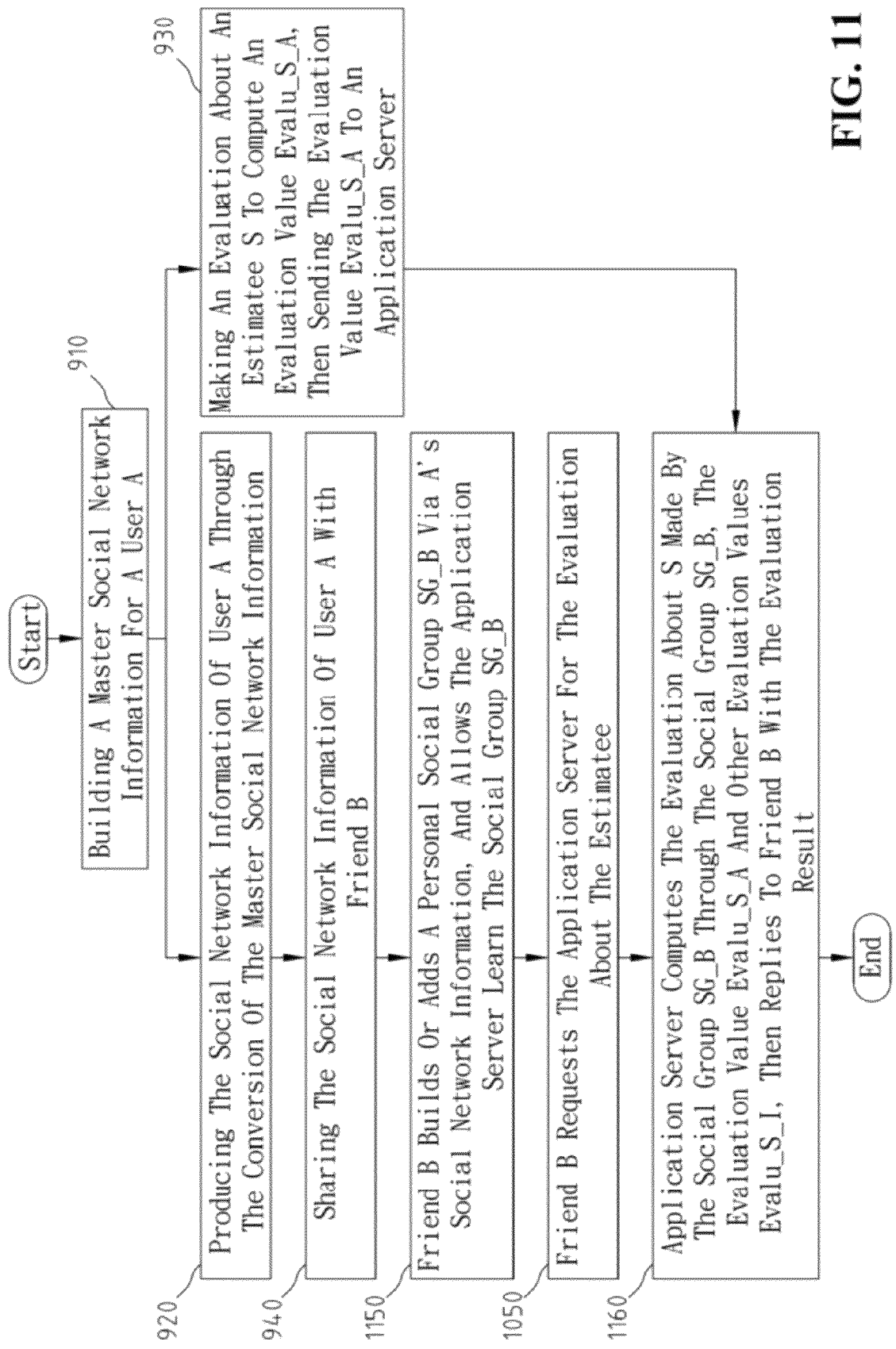
FIG. 11 shows an exemplary communication flow of the third working example, consistent with certain disclosed embodiments of the present invention.

Compared with the second working example, the major feature of the third working example is that before the step 1050, friend B builds or adds a personal social group SG_B via A's social network information, and allows the application server learn the social group SG_B. FIG. 11 shows an exemplary communication flow of the third working example, consistent with certain disclosed embodiments of the present invention.

Referring to FIG. 11, the exemplary communication flow may comprise the steps 910-940, step 1150, step 1050, and step 1160. In step 1150, friend B builds or adds a personal social group SG_B via A's social network information, and allows the application server learn the social group SG_B. Step 1160 is that the application server computes the evaluation about S through the social group SG_B, the evaluation value Evalu_S_A and other evaluation values Evalu_S_I, then replies to friend B with the evaluation result. In the third working example, the application server computes the evaluation about S made by the social group SG_B. Therefore, the privacy of the personal ID of users may be protected, which makes a user learn whether his/her friends had reputation only if the friends make him/her the same group.

Figure 12:
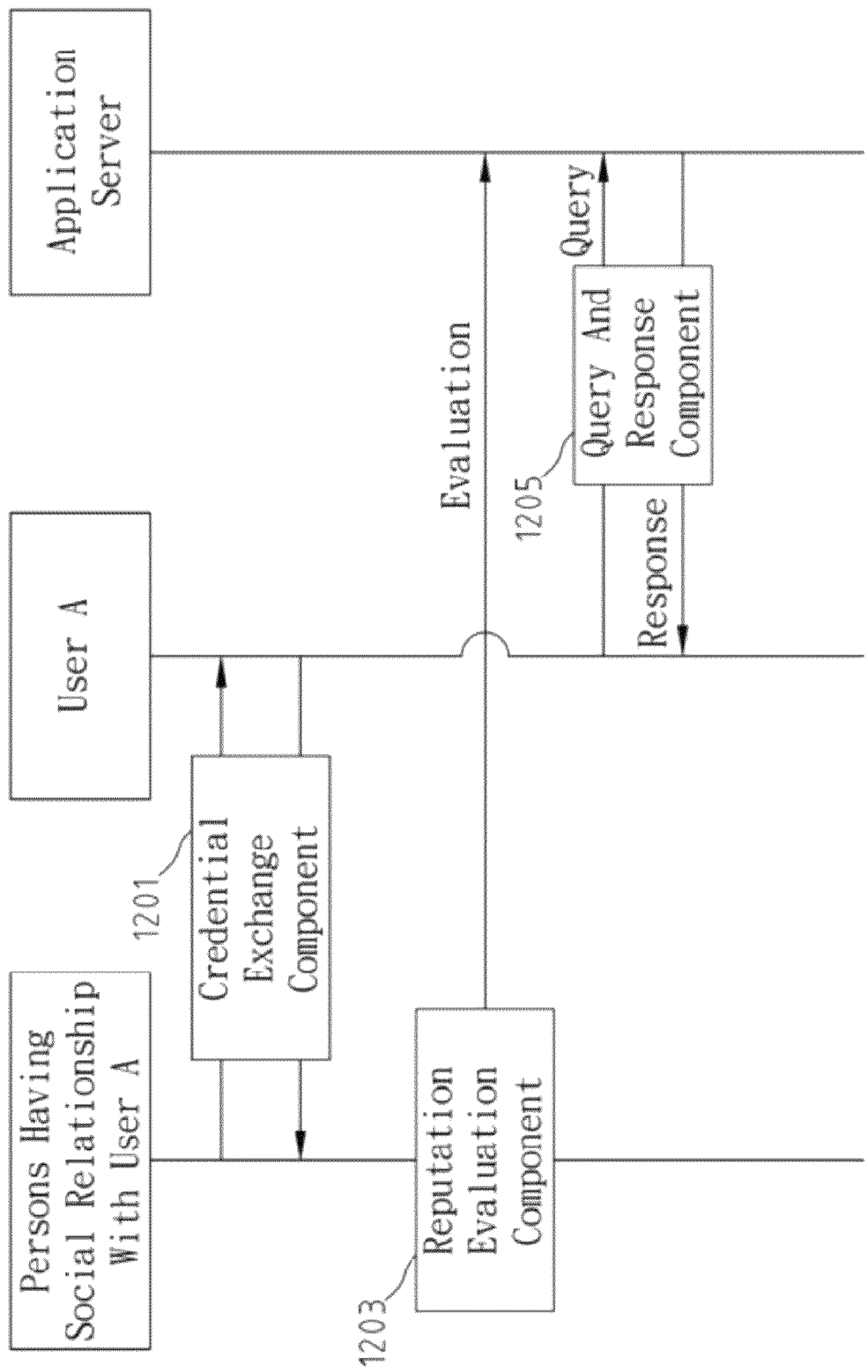
FIG. 12 shows an exemplary network reputation system, consistent with certain disclosed embodiments of the present invention.

Continuing now with an exemplary network reputation system by implementing the network reputation system in conjunction with one or more estimator's social networks and one estimatee's reputation network like any of those discussed above, the network reputation system may comprise a credential exchange component 1201, a reputation evaluation component 1203 and a query and response component 1205, as shown in FIG. 12. Credential exchange component 1201 permits a user to generate credential exchange matching items with those persons having a social relationship with the user. The credential exchange matching items may be generated via a secure and authenticated channel. Reputation evaluation component 1203 enables other users having a transaction with an estimatee to make evaluations about the estimatee via the sharing of social network information. Query and response component 1205 is capable of receiving a query from one person having a social relationship with the user for requesting an evaluation about the estimatee, and responding with an associated evaluation result to the person having a social relationship with the user via the sharing of social network information and the evaluations made by the other users about the estimatee.

The query may be further sent to an application server via query and response component 1205, and the associated evaluation result may be also generated by the application server then sent to the person via query and response component 1205.

The exemplary communication protocol depicted in the first working example of FIG. 9, i.e. private matching and signature are bounded together to achieve privacy preserving and data authentication, may be employed in the network reputation system. Another exemplary communication protocol depicted in the second working example of FIG. 10, i.e. sharing bridge identity and a way of signature to respectively achieve privacy preserving and data authentication, may also be employed in the network reputation system. In addition, the exemplary communication protocol depicted in the third working example of FIG. 11, i.e. server matching to achieve data authentication, may be employed in the network reputation system.

The network reputation system may be embodied in a reputation system model such as depicted in FIG. 1 and in conjunction with one or more computer-readable medium. The disclosed exemplary embodiments of the present invention may be applicable to many different scenarios like Internet auctions, online games, social networks, etc. And, the exemplary embodiments of the present invention may be partially or wholly implemented on one or more computer-readable medium having computer-executable instructions for running the four phases of Initialization, Credential Exchange, Reputation Evaluation, and Query and Response.

Figure 13:
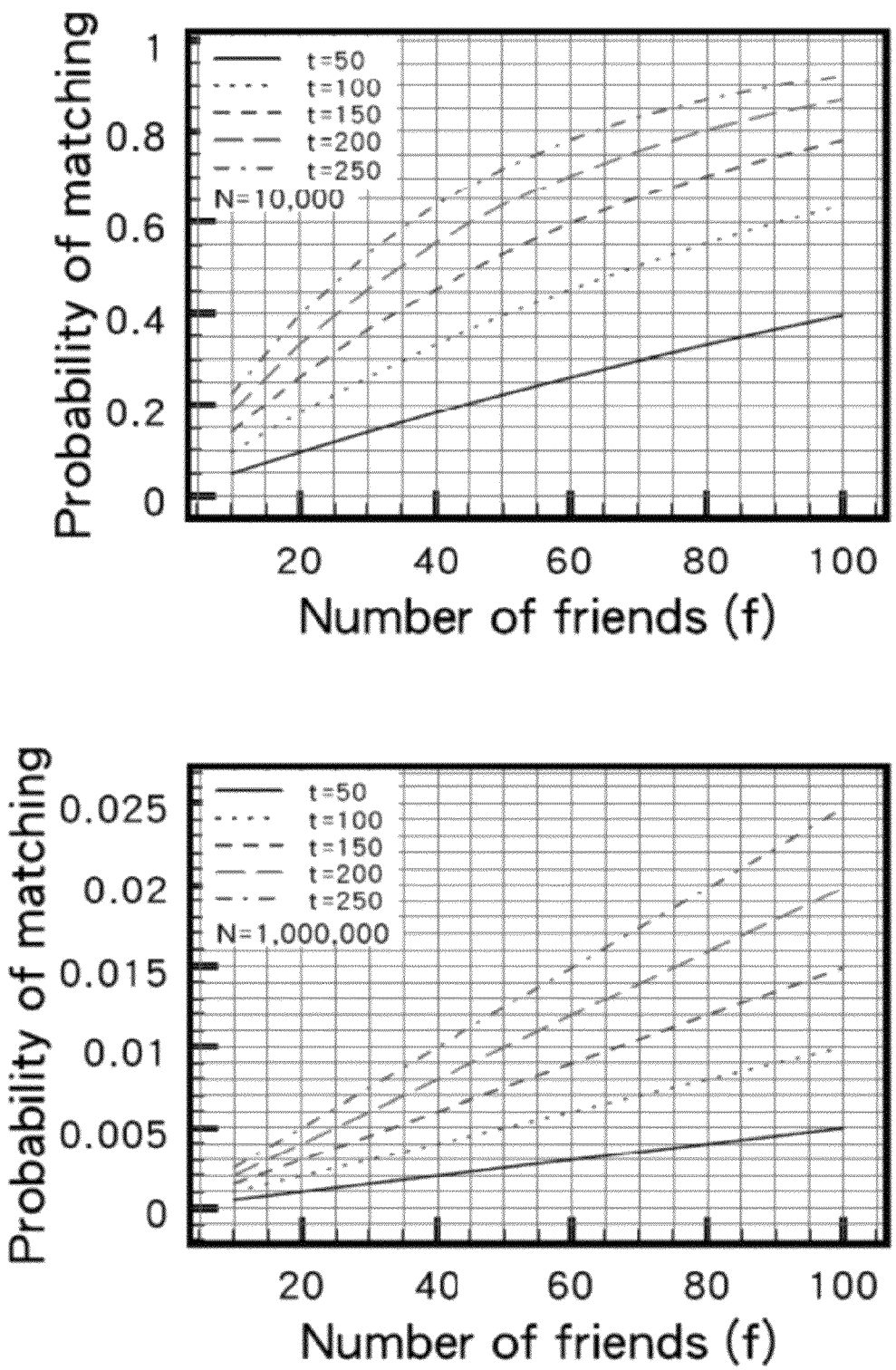
FIG. 13 illustrates an exemplary simulation result on probability of matching for different average number of friends for a one estimator, average number of reputing users for a one estimate, and number of users in the system, consistent with certain disclosed embodiments of the present invention.

For estimating the performance of the present invention, a simulation is performed by using maplesoft in the 2Gmhz-CPU with 1G-RAN PC environment. FIG. 13 illustrates an exemplary simulation result on probability of matching for different average number of friends for a single estimator (f), average number of reputing users for a single estimatee (t), and number of users in the system (N), consistent with certain disclosed embodiments of the present invention. The result shows that the disclosed network reputation system of the present invention may practically work if t and f are reasonably large. It also shows that the query for 2-distance items may highly increase the probability of matching since the number of friends becomes almost f×f.

In summary, the exemplary disclosed embodiments of the present invention provide a trustable network reputation system and its controlling method thereof, which may enable users to recognize evaluations submitted by those persons having social relationships with the users. The present invention may preserve the privacy of the social relationships from the website and the privacy of the mapping between the real identity of a user and her online identity from other users including her friends.

Although the present invention has been described with reference to the exemplary disclosed embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A controlling method for a network reputation system having an application server, a reputation evaluation unit, and a query and response unit, said method comprising the steps of:

producing master social network information of a user via a social network of said user, the master social network information including a personal identity of said user, a service identity that said user registers with an application server, and a matching key of said user;

sharing and exchanging social network information of said user with a plurality of people having a social relationship with said user in said social network over the social network, the exchanged social network information being generated through conversion of said master social network information and including a matching item computed from a cryptographic hash function of said matching key by a computer of said user;

sending an evaluation of reputation submitted by said user about an estimatee by said reputation evaluation unit to said application server, said evaluation including an evaluation value evaluated by said user about said estimatee, a service identifier of said estimatee and said matching item of said user;

sending a request by a person from the plurality of people having said social relationship with said user by said query and response unit to said application server for the evaluation about said estimatee, the request utilizing a private matching scheme derived from said matching item of said user;

generating an evaluation result about said estimatee by said application server, said evaluation result being derived from said request, said matching item of said user, said evaluation value evaluated by said user, said private matching scheme, and the evaluation submitted by said user; and replying to said person with said evaluation result about said estimatee by said query and response unit, wherein said person obtains said evaluation value evaluated by said user from said evaluation result by using said matching item of said user.

2. The method as claimed in claim 1, wherein said master social network information further includes a public key of said user, and a private key of said user.

3. The method as claimed in claim 2, wherein the evaluation value of said user inside said evaluation result is verified by the public key of said user.

4. The method as claimed in claim 1, wherein said matching key is a random value chosen by said user.

5. The method as claimed in claim 1, wherein said evaluation result about said estimatee is further derived from evaluation values evaluated by one or more other users.

6. The method as claimed in claim 5, wherein each of said user and said one or more other users has respective social network information in said master social network information and a private key inside the respective social network information, and the evaluation values evaluated by said user and said one or more other users are encrypted by their respective private keys inside their respective social network information.

7. The method as claimed in claim 1, wherein the network reputation system is associated with more than one social network.

8. The method as claimed in claim 1, wherein the private matching scheme is selected from HP, AgES or FNP scheme.

* * * * *